Sept. 1, 1953  R. A. RENWANZ  2,650,497
FLEXIBLE PITOT-STATIC TUBE ASSEMBLY
Filed Feb. 13, 1951  2 Sheets-Sheet 1

INVENTOR
ROGER A. RENWANZ
BY Stowell + Evans
ATTORNEYS

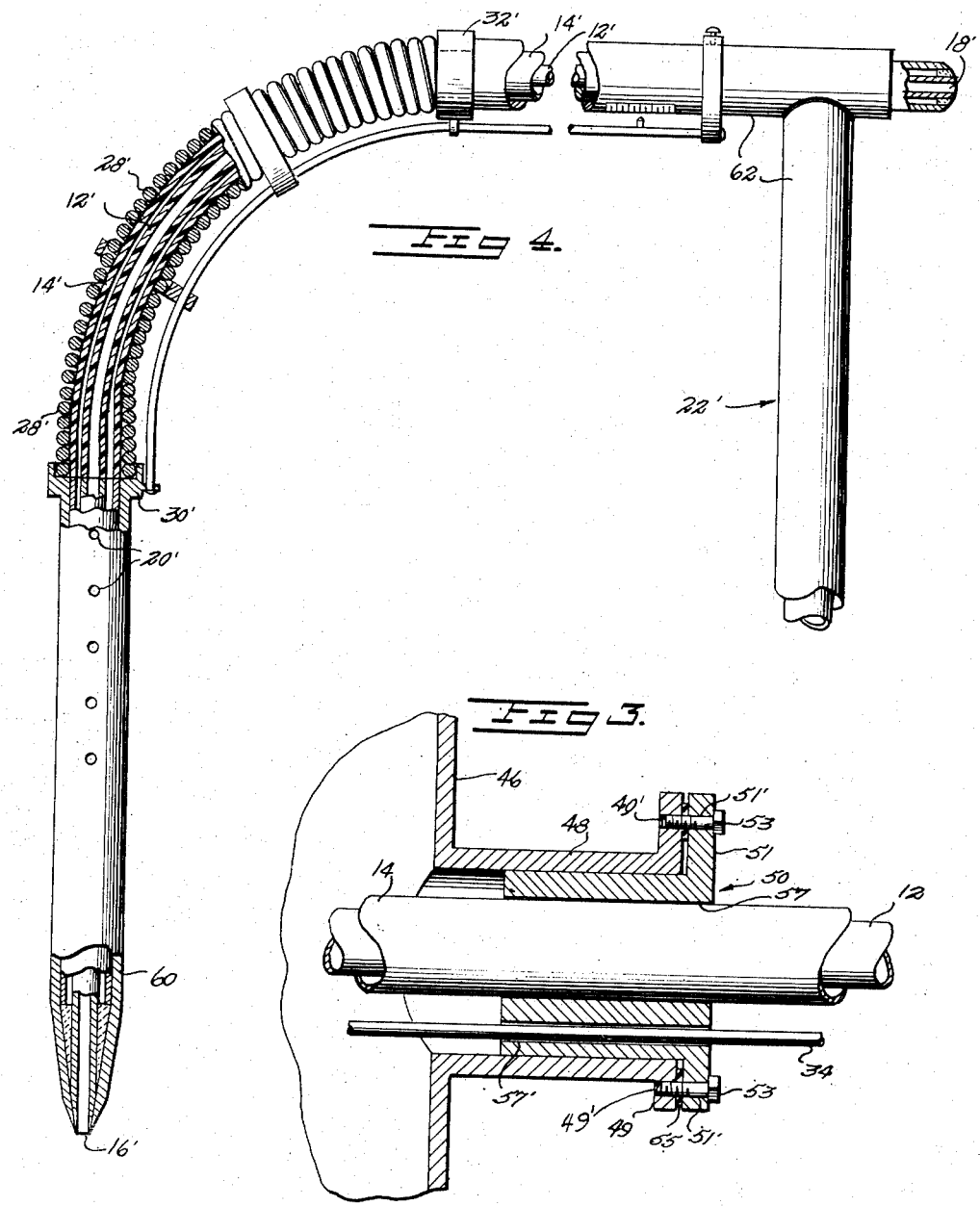

Patented Sept. 1, 1953

2,650,497

UNITED STATES PATENT OFFICE 2,650,497

FLEXIBLE PITOT-STATIC TUBE ASSEMBLY

Roger A. Renwanz, Bound Brook, N. J., assignor to Research Corporation, New York, N. Y., a corporation of New York Application February 13, 1951, Serial No. 210,635

5 Claims. (Cl. 73—212)

1

The invention relates to improvements in fluid velocity meters, and in particular to velocity meters of the Pitot tube type.

Pitot tubes or pitometers commonly comprise a pair of tubes projecting into a stream of material the velocity of flow of which is to be measured, one tube having an opening directed upstream to receive the dynamic pressure of the flowing substance and the other tube having an opening parallel to the flow or directed downstream, the difference between the pressures set up in the two tubes serving to determine the velocity of flow of the substance.

In determining the volume of gas or liquid passing through a flue or pipe, it is a common engineering procedure to determine the average velocity of the material flow with a Pitot tube and compute the volume from this average velocity and the cross-sectional area of the flue or pipe.

In practical applications, it has been found that even though the Pitot tube is accurately positioned with respect to the flue or pipe this may not be the true direction of flow as the velocity components of the substance to be measured may not be parallel with the flue or pipe. Thus whenever the direction of flow is not parallel to the flue or pipe a false reading is obtained unless the position of the Pitot tube in the flue is corrected.

It is a principal object of the invention to provide a Pitot tube or pitometer with a movable head, whereby the true direction of flow of material to be measured may be accurately and quickly established.

A further object is to provide such a device wherein the angle of flow in relation to the flue or pipe may be read directly from a calibrated scale.

Another object is to provide a Pitot tube having a flexible section whereby the angle of the head may be adjusted to permit the insertion of the tube into small openings.

These and other objects and advantages of the invention are provided by the velocity-meter of the invention which in its preferred embodiment comprises a pair of tubes having openings divergently directed, at least a portion of said tubes being flexible, and means for varying the flexure of said tubes.

A common form of Pitot tube comprises a pair of concentric tubes; an inner or impact tube which terminates in a small orifice which is pointed upstream of the material flow, and an outer or static pressure tube which surrounds the impact tube. A series of small holes are provided in the wall of the outer or static pressure tube and admit the substance to be measured at the mean pressure in their vicinity. The other end of each tube is then connected to some form of velocity or pressure indicating device such as a manometer.

2

For the purpose of illustration the invention will be more particularly described with reference to this form of Pitot tube for the measurement of the velocity of gas in a flue, with reference to the accompanying drawings in which:

Fig. 3 is an enlarged fragmentary detailed view in partial section of one form of mounting means for the device of the invention; and Fig. 4 is a fragmentary view in partial section of a modified form of the invention.

Figures 1, 2:
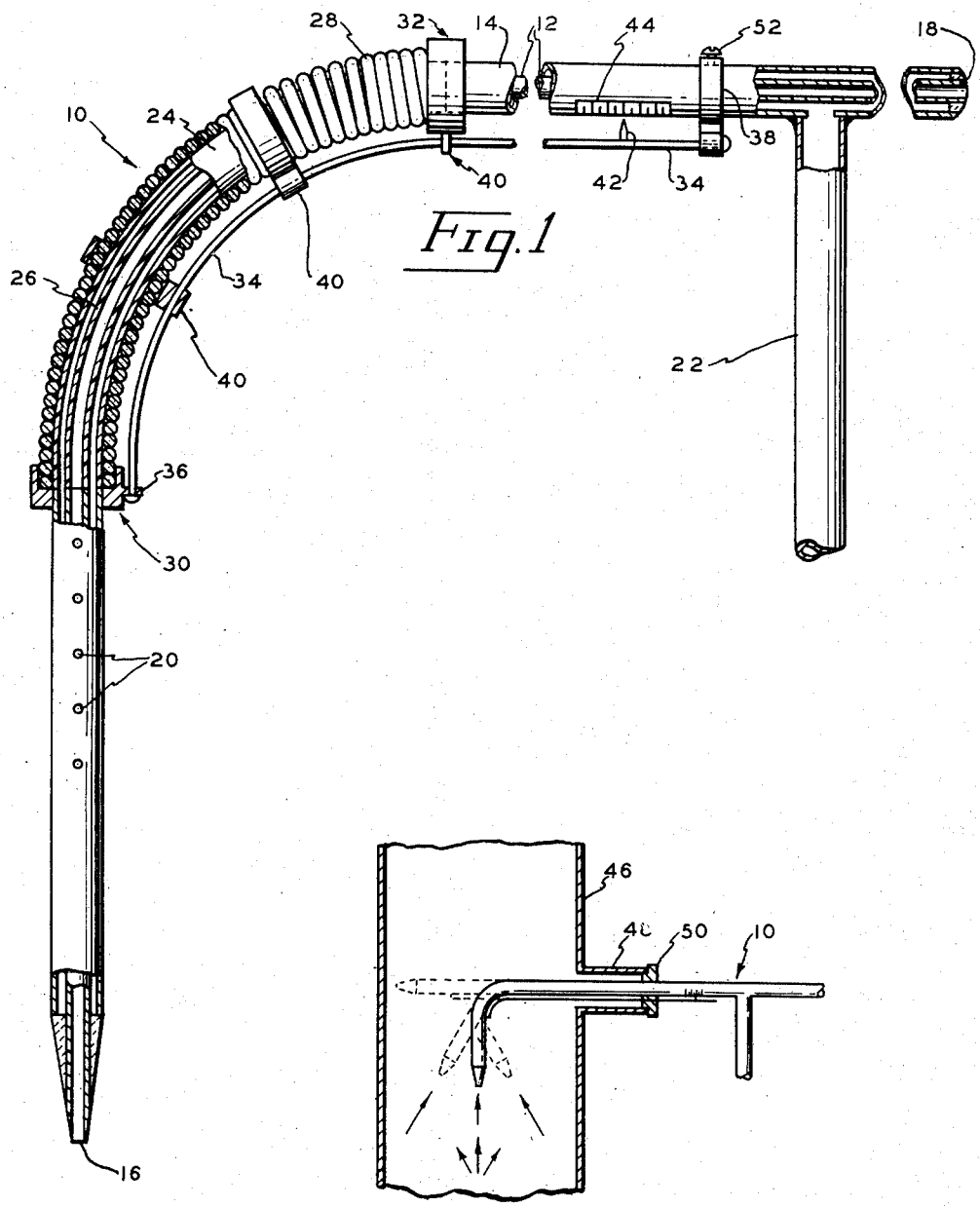
Fig. 1 is a fragmentary view in partial section of a Pitot tube constructed in accordance with the principles of the invention.
Fig. 2 is a view of the Pitot tube shown in Fig. 1 of the drawings in operating position within a gas flue.

With reference to the drawings 10 is the Pitot tube of the invention which generally comprises an impact tube 12, and a static tube 14.

The impact tube 12 terminates at one end in a small impact orifice 16 and the other end 18 is adapted to receive a tube or conduit from one leg of a manometer or other pressure indicating device.

The static pressure tube 14 surrounds the tube 12, and is closed at both ends; however, adjacent the impact end of the device there is provided a series of small holes 20 perpendicular to the axis of the static and impact pressure tubes, and adjacent the other end a nipple 22 is provided to receive a conduit from the other leg of the manometer.

Adjacent the head of the Pitot tube, and within the portion of the tube to be inserted within the flue, both the static and impact pressure tubes 12 and 14 are provided with flexible sections 24 and 26, respectively.

The flexible section of the inner and outer tubing may be constructed, for example, of plastic or crimped metal, the type of plastic or metal to be used depending on the nature and temperature of the material to be measured.

A helical spring 28 forms a sheath around the entire length of the flexible section and is secured at both ends by glands 30 and 32 connected to the non-flexible sections of the Pitot tube.

A flexible cable 34 is attached at one end to a flange 36 on the under side of gland 30, and at the other end to a cable clamp 38 slidably secured to the static tube 14 at a convenient point on that portion of the tube which extends outside the flue. This flexible cable 34 serves to bend the Pitot tube at its flexible section. In order to hold the flexible cable in position, guide rings 40 are positioned along the flexible section as shown in the drawings and on installations where the Pitot tube is long, at other convenient places on the non-flexible portion of the tube.

An indicator 42 attached to the flexible cable, and a reference scale 44 attached to the Pitot tube are adapted to show the position of the Pitot tube head, in degrees, for example.

To install the Pitot tube of the invention, for example, in a flue 46 provided with a nipple 48, clamp 38 is loosened to enable spring 28 to straighten any bend in the flexible portion of the Pitot tube. With the tube straight the head and flexible section is easily and conveniently inserted into the flue 46 through the nipple 48. A gland 50 is then screwed into the nipple opening to hold the Pitot tube against lateral and rotative displacement. Details of one form of nipple and gland which may be advantageously employed with this invention is shown in Fig. 3, wherein the nipple 48 is provided with a flange 49 at its outer end, and the gland 50 has a corresponding flange 51. The flange 49 is bored and tapped as at 49' while corresponding arcuate slots 51' are provided in the flange 51. Bolts 53 hold the two flanges together. The slots 51' permit limited rotational adjustment of the Pitot tube without removing it from the gland 50. Where desired, a gasket 55 may be provided between the two flanges.

The bore 57, in the gland 50, is of such size that it snuggly engages the outer surface of the tube 14, while bore 57' is of such a size that cable 34 is freely slidable therein. The head of the Pitot tube is then positioned at the desired angle to the flow of gas within the flue by moving flexible cable 34 and its locking clamp 38 back and forth. The head of the tube shown in the drawings may be swung through an arc of approximately 165°. When the desired position has been reached thumb screw 52 of clamp 38 is tightened and the Pitot tube head is locked in position.

From the foregoing description it will be seen that the present invention provides a velocity measuring device whereby the aims, objects and advantages of the invention are fully accomplished.

It will be evident that various modifications may be made in the construction of the device. For example, the entire Pitot tube may be made of a flexible plastic material such as "Teflon," a polymerized tetrafluoroethylene, and the tube supported throughout its length down to the point where bending is desired. A Pitot tube of this type is shown in Fig. 4 of the drawings wherein 12' and 14' are the impact and static tubes constructed of "Teflon." The Pitot static head extending from gland 30' to the impact orifice 16' is provided with a metal jacket 60, the gland 30' and the jacket 60 being welded together. Between gland 30' and gland 32' the metal jacket is replaced with a helical spring 28' as described with reference to Fig. 1 of the drawings. From the gland 32' to the end 18' and nipple 22' is another metal jacket 62 to which is welded the gland 32'. In the latter example the provision of a helical spring on the portion of the tube to be bent may be eliminated.

It is also evident that the invention is not limited to the form of Pitot tube shown in the drawings but is equally adaptable to other forms of Pitot tubes such as, for example, the pitometer.

I claim:
1. A flexible Pitot tube comprising a static pressure tube and an impact tube, portions thereof cooperating to form a Pitot head, a portion of each of said static and impact tubes rearwardly of the Pitot head being flexible, a resilient sleeve enclosing the flexible portions of said static and impact tubes urging said flexible portions into extended position and means for varying the flexure of the flexible portions of the static and impact tubes and the resilient sleeve secured to the Pitot tube forwardly of the resilient sleeve.

2. A flexible Pitot tube comprising a static pressure tube and an impact tube, portions thereof cooperating to form a Pitot head, a portion of each of said static and impact tubes rearwardly of the Pitot head being flexible, a resilient sleeve enclosing the flexible portions of said static and impact tubes, a flexible cable slidably carried along the axial length of the resilient sleeve at one side of the axis thereof and secured at one end to the Pitot head for varying the flexure of the flexible portions of said static and impact tubes and the resilient sleeve in response to movement of the other end of the flexible cable.

3. A flexible Pitot tube as defined in claim 2 wherein the resilient sleeve comprises a helical spring.

4. A flexible Pitot tube comprising a static pressure tube and an impact tube, portions thereof cooperating to form a Pitot head, said static and impact tubes each having a flexible portion intermediate the ends thereof, a helical spring sleeve enclosing the flexible portions of said static and impact tubes urging said flexible portions into extended position, a flexible cable slidably carried along the axial length of the helical spring at one side of the axis thereof and secured at one end to the Pitot head, means releasably securing the other end of said cable to said static and impact tubes rearwardly of the flexible portions thereof.

5. A flexible Pitot tube comprising spaced concentric static pressure and impact tubes, portions thereof cooperating to form a Pitot head, a substantial portion of each of said concentric tubes rearwardly of the Pitot head being flexible, a resilient sleeve about the flexible portions of said concentric tubes, gland means secured to the outermost of said concentric tubes and engaging the forward and rearward ends of said resilient sleeve, a flexible cable carried along the axial length of the resilient sleeve and at one side of the axis thereof, said flexible cable secured to the gland means at the forward end of the resilient sleeve and slidably carried by the gland means at the rearward end of the resilient sleeve, clamp means releasably secured to the outermost of said concentric tubes rearward of the said rearward gland means and secured to the flexible cable, and an indicator secured to the flexible cable between the rearward gland means and the clamp means.

ROGER A. RENWANZ.

References Cited in the file of this patent

UNITED STATES PATENTS

| Number | Name | Date |
|---|---|---|
| 136,844 | Lyles | Mar. 18, 1873 |
| 297,919 | Day | Apr. 29, 1884 |
| 555,147 | Burck | Feb. 25, 1896 |
| 1,146,202 | Ogilvie | July 13, 1915 |
| 1,752,193 | Hanlon | Mar. 25, 1930 |
| 2,512,278 | Jones | June 20, 1950 |
| 2,554,634 | Paine et al. | May 29, 1951 |

FOREIGN PATENTS

| Number | Country | Date |
|---|---|---|
| 413,102 | Germany | May 5, 1925 |
| 549,177 | Great Britain | Nov. 10, 1942 |